(12) United States Patent
Yehuda et al.

(10) Patent No.: US 9,282,005 B1
(45) Date of Patent: *Mar. 8, 2016

(54) IT INFRASTRUCTURE POLICY BREACH INVESTIGATION INTERFACE

(75) Inventors: Hanna Yehuda, Newton, MA (US); Amanuel Ronen Artzi, Framingham, MA (US); Ju-Lien Lim, Reading, MA (US); Eran Dvir, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 1973 days.

This patent is subject to a terminal disclaimer.

(21) Appl. No.: 11/933,586

(22) Filed: Nov. 1, 2007

(51) Int. Cl.
*G06F 17/00* (2006.01)
*H04L 12/24* (2006.01)
*H04L 29/06* (2006.01)

(52) U.S. Cl.
CPC .................................. *H04L 41/0893* (2013.01)

(58) Field of Classification Search
CPC ...... H01F 27/04; H01G 4/28; H02B 13/0356; H04L 41/069; H04L 41/0893; H04L 41/22
USPC ............................................................ 726/1
See application file for complete search history.

(56) References Cited

U.S. PATENT DOCUMENTS

| | | | | |
|---|---|---|---|---|
| 7,805,752 B2 * | 9/2010 | Newstadt | ............... | H04L 63/102 726/1 |
| 7,849,176 B1 * | 12/2010 | Jalagam | ................. | G06Q 10/00 709/217 |
| 8,024,772 B1 * | 9/2011 | Yehuda | ................. | H04L 41/069 726/1 |
| 2004/0205089 A1 * | 10/2004 | Alon | ........................ | H04L 29/06 |
| 2005/0125688 A1 * | 6/2005 | Ogawa | ............... | H04L 43/0835 726/1 |
| 2005/0172142 A1 * | 8/2005 | Shelest | ................. | G06F 21/577 713/191 |
| 2006/0129672 A1 * | 6/2006 | Mayer | ........................... | 709/223 |
| 2006/0167858 A1 * | 7/2006 | Dennis et al. | ...................... | 707/3 |
| 2006/0184490 A1 * | 8/2006 | Heim | ..................... | G06N 5/025 706/46 |
| 2007/0061874 A1 * | 3/2007 | Coppola et al. | ................. | 726/10 |
| 2007/0143851 A1 * | 6/2007 | Nicodemus et al. | ............. | 726/25 |
| 2007/0226631 A1 * | 9/2007 | Tevis | ...................... | H04L 43/16 715/736 |
| 2008/0005285 A1 * | 1/2008 | Robinson | ................ | H04L 63/20 709/220 |
| 2008/0082585 A1 * | 4/2008 | Elgezabal | ...................... | 707/200 |
| 2008/0172716 A1 * | 7/2008 | Talpade | .............. | H04L 41/0869 726/1 |
| 2008/0209280 A1 * | 8/2008 | Dilillo et al. | ..................... | 714/48 |
| 2008/0209505 A1 * | 8/2008 | Ghai et al. | ......................... | 726/1 |
| 2008/0282347 A1 * | 11/2008 | Dadhia et al. | .................... | 726/22 |
| 2009/0271863 A1 * | 10/2009 | Govindavajhala et al. | ...... | 726/23 |
| 2010/0064039 A9 * | 3/2010 | Ginter et al. | .................. | 709/224 |

* cited by examiner

*Primary Examiner* — Ashok Patel
*Assistant Examiner* — Gary Gracia
(74) *Attorney, Agent, or Firm* — Krishnendu Gupta; Gerald P. Kazanjian

(57) ABSTRACT

In a large network, it can be difficult to pinpoint and track down the causes of breaches of established policies. A policy compliance server allows traversal of notifications according to breaches, organizes the breaches (vulnerabilities and violation) according to severity and recurrence, and identifies related rules, network entities and configuration changes, which may be related to the breach. An integrated graphical user interface (GUI) provides efficient, timely traversal and analysis of rule breaches across the network to allow quick, efficient identification of the underlying cause or condition of the rule breach. A discoverer gathers configuration data including notifications of changes, alerts, and conditions in the network that are pertinent to the rule breaches. A compliance engine evaluates the configuration data against the rules to identify breaches. Therefore, the compliance engine identifies breaches (rule violations and vulnerabilities) across the network to be addressed for compliance with the policies in effect in the network.

23 Claims, 14 Drawing Sheets

IT INFRASTRUCTURE POLICY BREACH INVESTIGATION INTERFACE

BACKGROUND

In a managed information environment, a network fabric, or infrastructure, interconnects network elements, or nodes, for providing various services to end users that are also connected to the network. In a managed information network, for example, a number of storage arrays are interconnected to provide data storage and retrieval services. The storage arrays connect to other elements such as switches and hosts to efficiently provide the data storage and retrieval services to the users. Further, each storage array includes a set of individual storage devices (e.g. disk drives) that are themselves considered network elements, or entities. The collection of elements defines a configuration of the information network that is often updated to respond to request for changes and/or failure/degradation scenarios in the network, such as for resource expansion and reconfiguration, performance improvements, message traffic redirection, and equipment failures.

In a typical information network, the number of interconnected elements can become large, resulting in a substantial number of relationships and dependencies between the network elements (nodes), the network connections between them, and the applications that are layered over them that consume their resources. Accordingly, a set of rules may be implemented to identify desired or mandatory practices in the network, such as ensuring a redundant link between critical nodes, or mandating deployment of application A on a node with application B, for example. This set of rules defines a policy that network administrators enforce to maintain the network in a predictable and manageable state. However, identifying and verifying compliance of each of the rules across the network may become cumbersome in a large network. Furthermore, the policy including the rules may be driven by external factors, such as corporate directives, security requirements, industry best practices, Federal regulations, as well as vendor supported configurations. Therefore, at any particular site or enterprise, there may be multiple policies to satisfy, each having a plurality of rules in effect.

In the managed information network, therefore, multiple policies proscribing or requiring network practices may be imposed. These policies specify various configuration guidelines, such as requirements for connections between nodes (hosts, network devices), application dependencies for services provided by the nodes, and configurations of individual nodes. Each policy includes a plurality of rules that identifies network elements, or objects (hosts, services, or connections), a scope of the rule identifying which network objects it applies to, and a condition to test for satisfaction of the rule.

SUMMARY

A managed information network includes interconnected network entities in an IT infrastructure that provides various data services to users. Often such services rely on efficient transport of large amounts of data through a network. Typically, the managed information network (network) supports many consumers who, in effect, compete for the available network resources. Accordingly, information network operators such as employers, corporations, and universities, for example, establish information network policies (policies) to codify guidelines, or rules, that define best practices to ensure a fair, efficient and productive distribution of network resources to the users.

In the network, a breach of best practice policy takes the form of vulnerabilities and violations. A violation is a deviation from an expected standard set by a rule, typically expressed as a value deviating from an expected range. A vulnerability is an area of concern that has not yet risen to the gravity of a violation. The network conditions contributing to a vulnerability (potential rule violation) can often be tracked and identified before rising to the level of a rule violation. Identification of anomalies along a path (interconnection) or group of related network objects can lead to identification and correction of a less than optimal condition before it becomes a violation. For example, a rule may specify a maximum high water mark of available space in a storage array. If a rule requires at least 10% free space of a storage array be available, identification of the condition at 85% capacity (a vulnerability) may allow remedial action before a violation occurs at 90%.

Configurations of the invention described herein are based, in part, on the observation that in a large network, it can be difficult to pinpoint and track down the causes of rule violations deviating from established policies. Network event and monitoring systems generate a multitude of notifications of faults, problems and configuration changes in the network. Conventional environment monitoring mechanisms, however, suffer from shortcomings that they do not categorize and correlates notifications to those triggering rule breaches, and do not identify related network entities and rules. Accordingly, configurations herein substantially overcome the shortcoming of conventional policy monitoring and enforcement by providing a compliance server, disclosed further below, which allows traversal and correlation of notifications according to breaches, organizes the breaches (vulnerabilities and violation) according to severity and recurrence, and identifies related rules and network entities (physical, logical, and virtual) which may be related to the breach. Such arrangements, in the example configuration, take the form of a storage area network (SAN), and includes various logical permutations such as so-called VSAN (Virtual SAN) and Vmware arrangements. An integrated graphical user interface (GUI) provides efficient, timely traversal and analysis of rule breaches across the network to allow quick, efficient identification of the underlying cause or condition of the rule breach. Further, as disclosed below, a policy breach is applicable not only to networks and pathing but also application, services, dependencies, performance, and other factors as the policy and rule set are defined.

To ensure compliance with the policy or policies in effect for a given network environment (network), the rules of the policy are periodically evaluated. A discoverer or other suitable mechanism traverses the network topology and the information relationship graph to gather configuration data pertaining to the general state of the network. The configuration data includes notifications of configuration changes, alerts, status, state information, relationship, dependencies, and conditions in the network that are pertinent to the rule compliance. A compliance engine evaluates the configuration data against the rules to identify breaches. Therefore, the compliance engine identifies breaches (violation and vulnerability rules) across the network to be addressed and corrected for compliance with the policies in effect in the network.

The compliance engine is responsive to the GUI for traversing the violations by an operator to evaluate the rule breaches and identify the set of network conditions contributing to each of the breaches. Often, a condition underlying a breach contributes to or causes other breaches in related network entities. An operator evaluating the violations may employ the GUI to traverse the violations, identify related objects and rules, and drill down into the network conditions resulting in the rule breach to determine the underlying cause. The GUI therefore provides an operator a tool for efficient traversal of violations to pinpoint conditions and information network events causing the breach and provide a remedy.

In further detail, the configurations herein disclose a method of tracking network compliance, establishing a network policy, in which the network policy includes rules, the rules for specifying a desired state of a network entity in a network environment, and performing discovery on the network environment, such that discovery identifies configuration data applicable to the rules. A compliance engine receives notifications indicative of network events, in which the network events modify a particular value such that the value defines a state of a particular network entity or relationship between network entities in the network environment. The compliance engine evaluates the received notifications against the rules in the network policy to identify network states inconsistent with a rule indicative of the desired state for the evaluated network state, and the GUI allows further navigation of the evaluated notifications and related entities to identify states corresponding to a breach.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a configuration change screen itemizing configuration changes;

FIG. 13 shows administrative views including groups of network entities; and

DETAILED DESCRIPTION

In a network environment, adherence to an established policy facilitates efficient and fair distribution of resources to all users of the network. Similarly, deviation from the established policies can cause slowdown, bottlenecks, and outright failures or other circumstances leading to reduced or interrupted provision of services to some or all users of the networks. Further, in large and complex networks, it can be difficult to pinpoint and track down the causes of rule violations deviating from established policies. Accordingly, configurations herein are based, in part, on the observation that identifying problematic notifications triggering rule breaches can be difficult in large network environments where many notifications pertaining to both malignant and benign occurrences are collected.

Unfortunately, conventional environment monitoring mechanisms do not categorize notifications according to those triggering rule breaches, and do not identify related network entities and rules that may also be related. Accordingly, configurations herein substantially overcome such shortcomings by allowing traversal and correlation of notifications according to rule breaches, organizing the breaches according to severity and recurrence, and identifying other rules and network entities which may be related to the rule breach. In this manner, configuration herein provide a graphical user interface for efficient, timely traversal and analysis of rule breaches across the network to allow quick, efficient identification of the underlying cause or condition of the rule breach.

Figure 1:
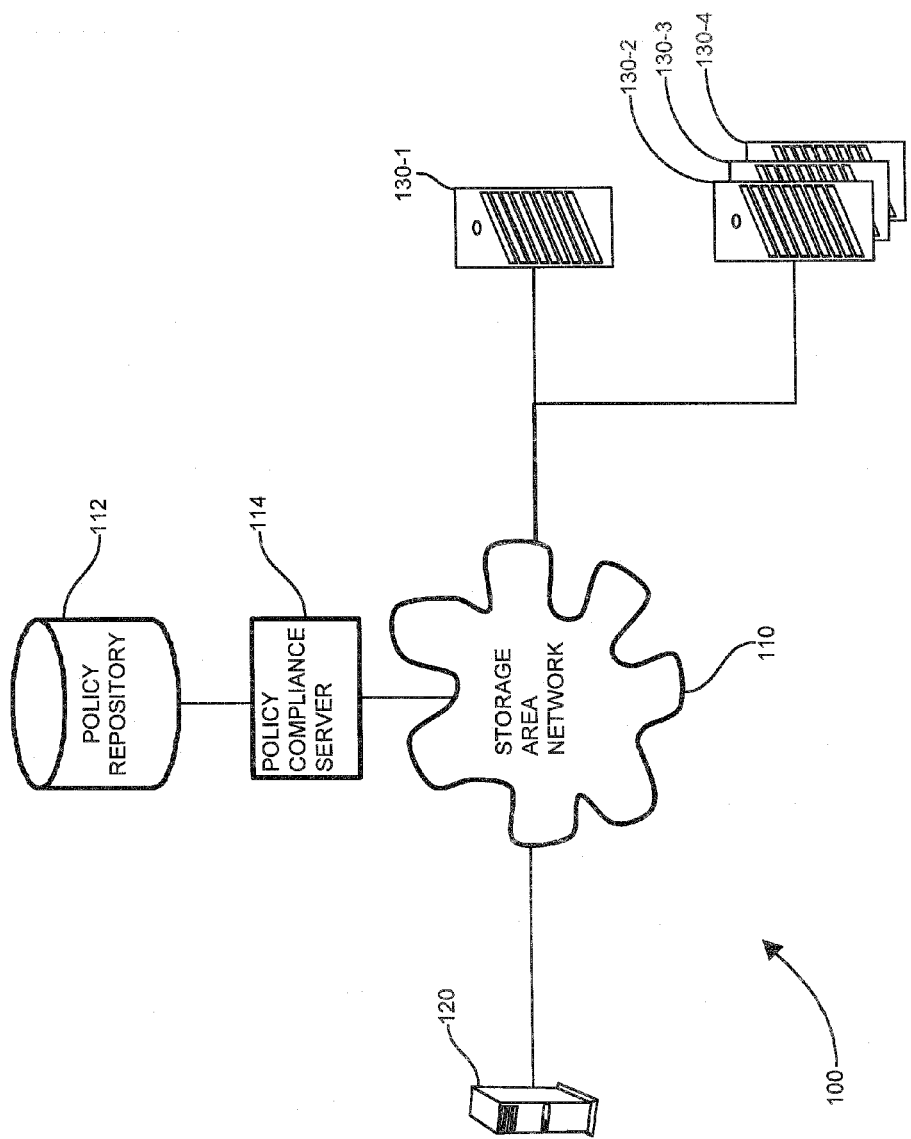
FIG. 1 is a context diagram of a managed information network environment suitable for use with the present invention.

FIG. 1 is a context diagram of a managed information network environment suitable for use with the present invention. Referring to FIG. 1, a managed information environment 100 includes a storage area network 110 interconnecting at least one host 120 and a plurality of storage entities 130-1 . . . 130-4 (130 generally) such as storage arrays. The example environment 100, in general, represents an information network which may include SANs as well as IP network and other integrations. The storage area network 110 (SAN) employs policies stored in a policy repository 112 and administered via a policy compliance server 114.

In a typical managed information network, the number of interconnected elements can become large, resulting in a substantial number of relationships between the network elements (nodes), the network connections (and other relations)

between them, and the applications that execute on them. Accordingly, a set of rules may be implemented to identify good or mandatory practices in the network, such as providing a redundant host port in paths between hosts and storage entities, or a fabric redundancy mandating routing of I/O paths through a minimum number of fabrics, for example. Other rules deal with multipathing configuration and versions based on the OS type, and also application discovery and compliance. This set of rules defines a policy that network administrators enforce to maintain the network in a predictable and manageable state. In the managed information network 100, therefore, multiple policies proscribing or requiring network practices may be imposed. These policies specify various configuration guidelines, such as requirements for connections between nodes (hosts), application dependencies for services provided by the nodes, and configurations of individual nodes. Each policy includes a plurality of rules that relates to network elements, or managed objects (hosts, storage, network switches and routers, services, or connections), a scope of the rule identifying which network objects it applies to, and a condition to test for satisfaction of the rule.

Such rules are generally in the form of [object] [scope] and [condition], where the object defines the managed object the rule applies to, and scope refines the object set. The objects typically specify hosts (nodes), storage (nodes), network switches and routers (nodes), services (applications) and connections (information flow paths). The condition then defines the test criteria to determine compliance with the rule. Failure to satisfy the condition constitutes noncompliance with the rule, and a predetermined number of failed rules indicate failure of the policy to which they belong. The rules of a policy are generally selected along a particular theme, such as security, standards compliance, or efficiency. Rules may often be predicated on connections between nodes or applications. By way of further example, a rule may call for a switch port redundancy to ensure that host 142 to volume (storage entity 146) I/O paths are routed through at least N host connected switch 144 ports and at least N storage entity connected switch 144 ports. This arrangement ensures that failure of ant single port will not interrupt the path from the host to the storage entity 146 (typically a storage array). An unsecured connection may indicate a vulnerable link, fraud, or unauthorized employee usage. Further details on policy and rule scope and definition may be found in copending U.S. patent application Ser. No. 11/769,407, filed Jun. 27, 2007, entitled "POLICY BASED NETWORK COMPLIANCE" and copending U.S. patent application Ser. No. 11/769,499, filed Jun. 27, 2007, entitled "RULE BASED NETWORK RESOURCE COMPLIANCE", both incorporated herein by reference.

Figure 2:
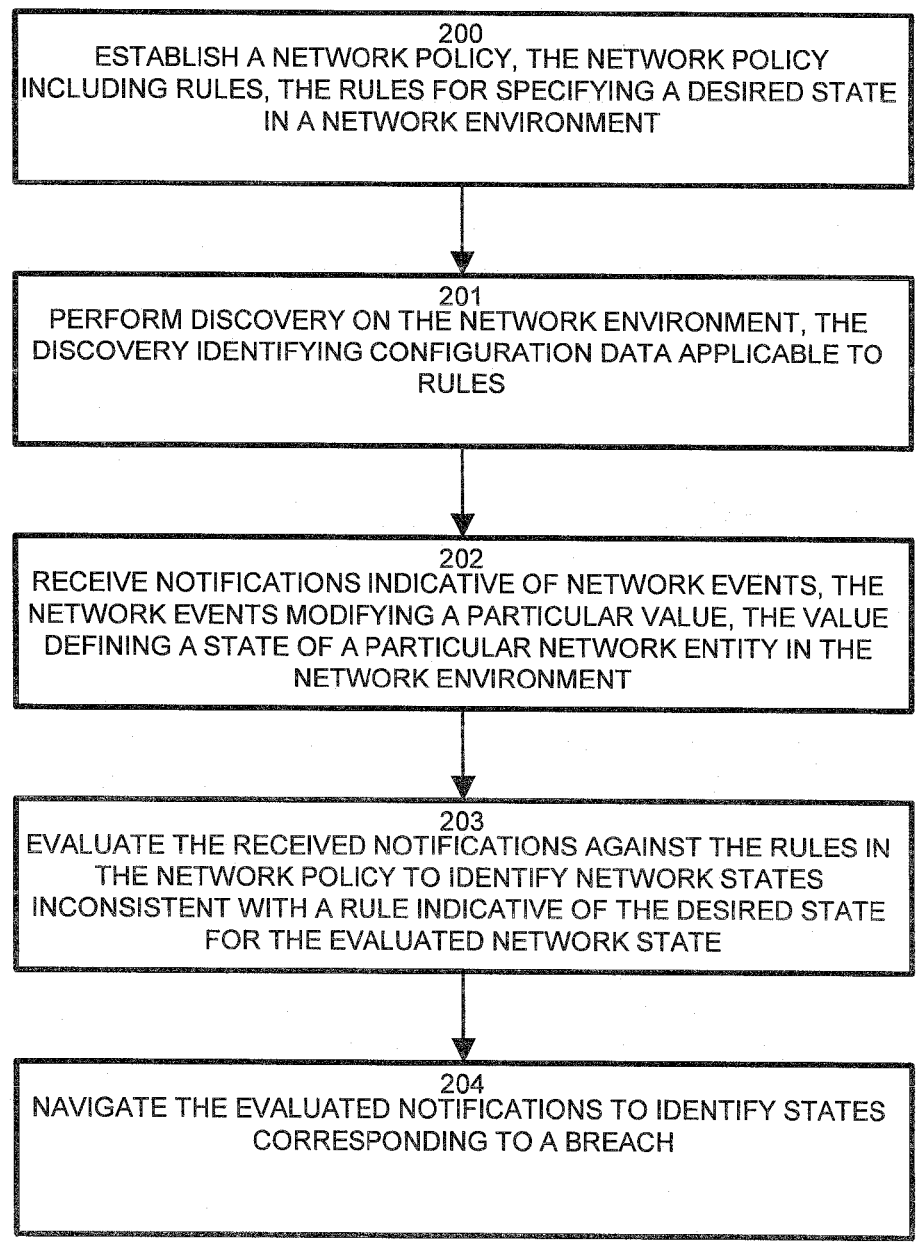
FIG. 2 is a flowchart of breach processing in the environment of FIG. 1.
Figure 3:
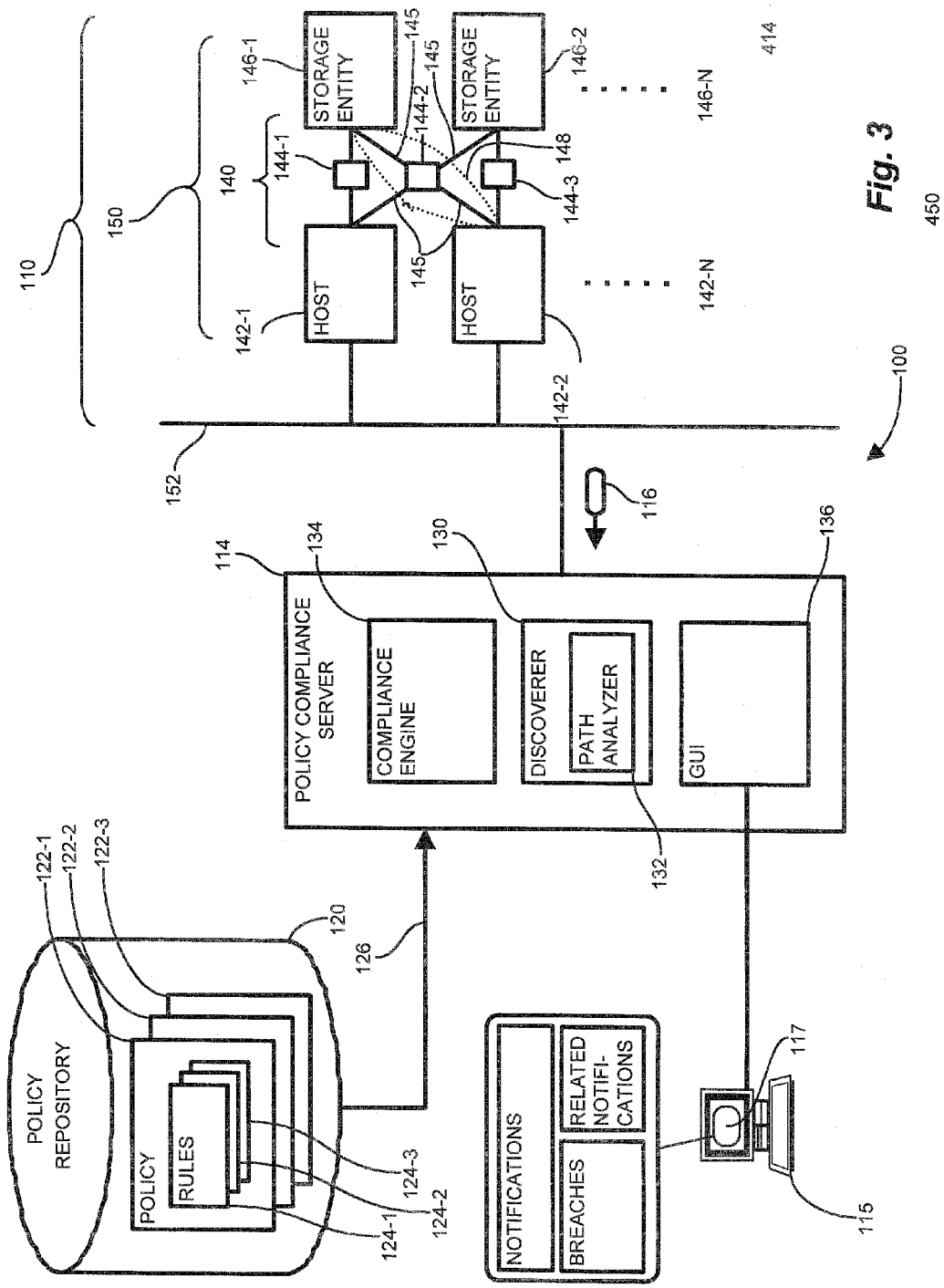
FIG. 3 is a block diagram of traversal and analysis of notifications pertaining to network entities triggering breaches.

FIG. 2 is a flowchart of breach processing in the environment of FIG. 1. Policy breaches are applicable to various policies, which related and address different concerns based on the needs and goals of the particular policy. There may therefore be multiple policies in force applicable to a particular IT environment 100 and included network 110. Referring to FIGS. 1-3, method of tracking network configuration compliance as defined herein includes, at step 200, establishing an information network configuration policy, such that the network policy includes rules for specifying a desired state of a network environment, and performing discovery on the network environment, in which discovery identifies configuration data (entities, state, status, relationships an dependencies) applicable to the policy rules, as depicted at step 201. Policy compliance is tracked by evaluating policy rules and navigating among other notifications obtained in the discovery process to identify other breaches from related objects.

Accordingly, the policy compliance server 114 receives notifications indicative of network events, in which the network events indicate modification of a particular value, as disclosed at step 202, such that the value defines a state of a particular network entity in the network environment, typically an attribute of a network entity. The notifications refer generally to various informational items, and more specifically to occurrences that indicate problems The compliance engine 134 (FIG. 3) evaluates the received notifications against the rules in the network policy to identify network states inconsistent with a rule indicative of the desired state for the evaluated network state, as depicted at step 203, and the GUI 136 (FIG. 3) allows navigation of the evaluated notifications to identify states corresponding to a breach, as shown at step 204. Such iterative navigation of breaches allows a user to identify related configuration changes, events and narrow conditions in the network to identify the underlying cause of the breach as well as identify impact of the breach on the affected object and other related network entities. The compliance server 114 correlates related changes/events to breaches and enabling the GUI to group conditions and related breaches to reduce the time to conclusion and resolution of the breach.

FIG. 3 is a block diagram of traversal and analysis of notifications pertaining to network entities triggering breaches. Referring to FIGS. 1 and 3, the policy repository 112 includes a plurality of policies 122-1 . . . 122-3 (122 generally), and within each policy, a plurality of rules 124-1 . . . 124-3 (124 generally). The policies and rules are defined by any suitable method, such as those disclosed in copending patent applications cited above.

The policy compliance server 114 includes a discoverer 130 having a path analyzer 132, a compliance engine 134, a GUI 136, and a policy management interface 126 to the policy repository 120. The discoverer 130 receives notifications 116 from the network 110, including information pertaining to state changes triggering policy breaches. This also discovers initial topology and dependencies of information network elements and current state and status. The compliance engine 134 receives policy 122 and rule 124 information via the policy interface 126. The path analyzer 132 further identifies path 148 related network entities 150 (below) to allow the compliance engine 134 to associate them with rules 124 related to a given breach so that particular rules may be applied in near real time via further discovery (discussed below). The compliance engine 134 analyzes the state changes given by the notifications 116 to conclude whether breaches have occurred, and further to identify whether the breach is a violation or a vulnerability. The GUI 136 presents an interactive set of reports concerning breaches for rendering to a user/operator via a display screen 117 on an operator console 115.

The policy compliance server 114 couples to the network 110 via an interface 152, and receives notifications 116 and performs discovery in accordance with principles outlined herein. The network 110, which in the example arrangement is a storage area network (SAN), interconnects network entities 150, including network objects such as hosts 142-1 . . . 142-2 (142 generally), storage entities 146-1 . . . 146-2 (146 generally) and switches 144-1 . . . 144-3. The network entities 150 interconnect in a fabric 140, which further defines other network entities such as connections 145 and paths 148. It should be noted that paths encompass configuration settings such as zonings, masking and mapping all being analyzed by the path analyzer to create a complete picture of current network topology and changes occurred while being monitored.

Figure 4:
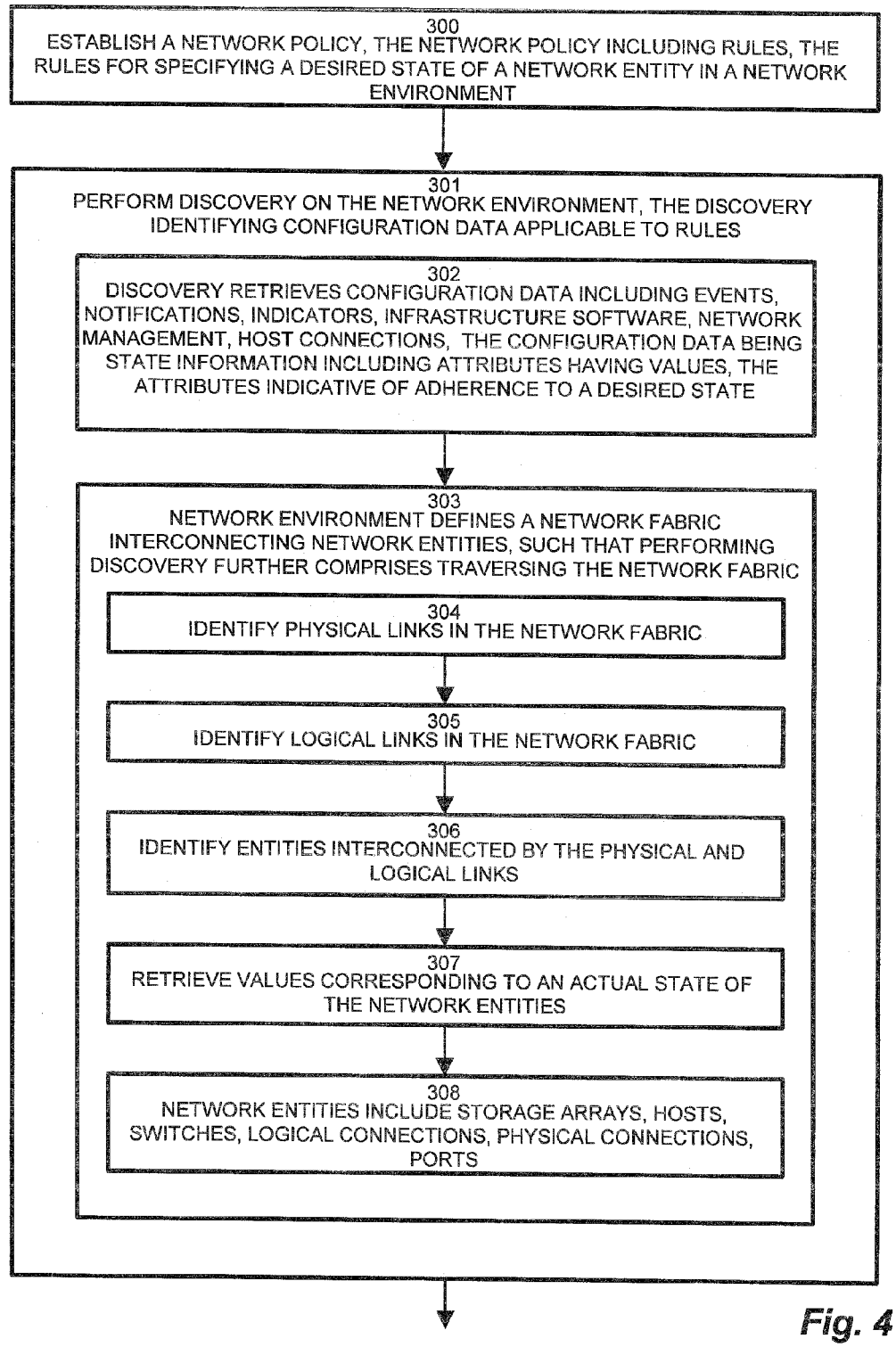
FIGS. 4-6 are a flowchart of breach investigation employing the GUI for traversing and analyzing the violations.
Figure 5:
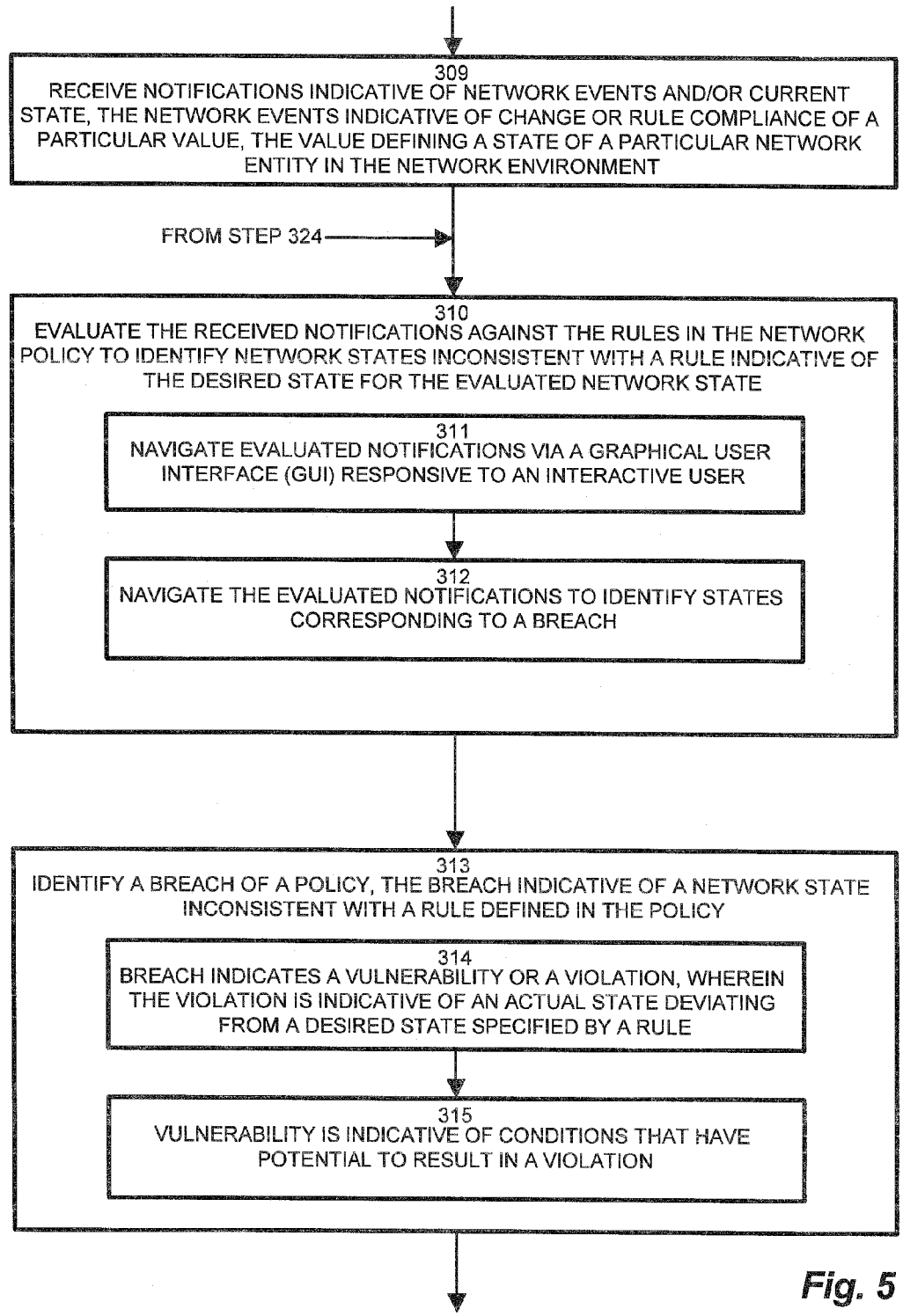
Figure 6:
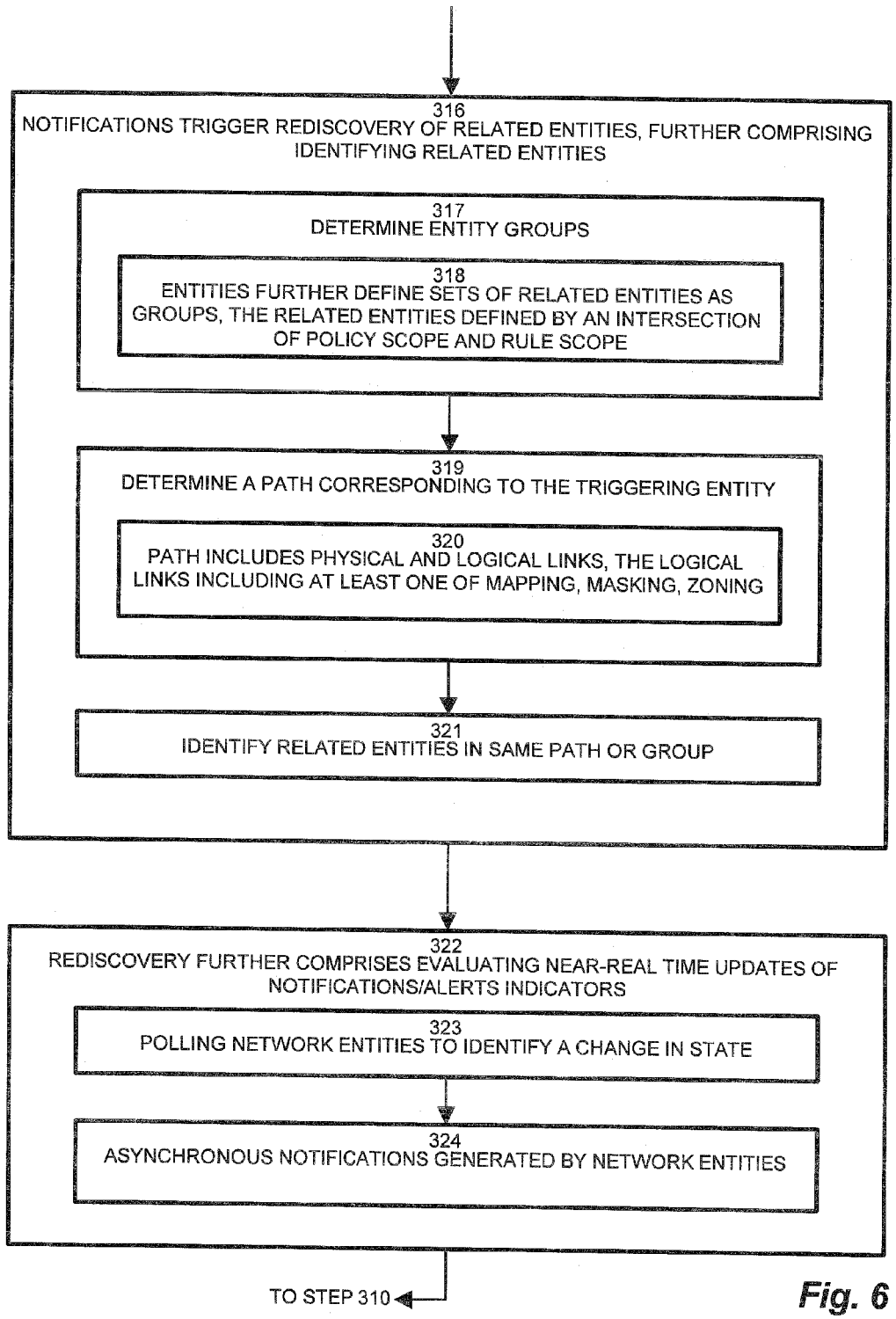

FIGS. 4-6 are a flowchart of breach investigation employing the GUI for traversing and analyzing the violations and vulnerabilities. Referring to FIGS. 1 and 3-6, navigation of the notifications to assess breaches of network compliance includes establishing a network policy including rules 124, such that the rules are for specifying a desired state of a network entity 150 in the network environment 100, as shown at step 300, and performing discovery and monitoring on the network environment, in which discovery identifies configuration data applicable to the rules 124, as depicted at step 301. Discovery and monitoring thus maintains tracking the environment and changes thereto, including states of relations (i.e. connections) between entities. Discovery retrieves configuration data including events, notifications, indicators, infrastructure software, host and network access control configuration, storage and their respective configurations, host configurations, network elements and their respective configurations and physical and logical connections, in which the configuration data defines state information including attributes having values, such that the attributes are indicative of adherence to a desired state, as shown at step 302. Adherence is based on the values corresponding to an expected value for a desired state such that the rules are responsive to the configuration data for identifying conformity with a particular rule. In other words, the values in notification identify either breach or compliance with a condition in the corresponding rule.

In discovery, the network environment 100 defines a network fabric 140 interconnecting network entities 150, such that performing discovery further includes traversing the network fabric 140, as depicted at step 303. In the example configuration disclosed herein for illustrative purposes, the network environment 100 is a storage area network (SAN), and the network entities 150 are storage domain entities including storage arrays, hosts, and switches, and in which the violation is indicative of a actual state deviating from an intended state of a storage domain entity. Accordingly, discovery further includes identifying physical links 145 in the network fabric 140, as shown at step 304, and identifying logical links such as path 148 in the network fabric 140, as depicted at step 305. The discoverer 130 identifies entities 150 interconnected by the physical and logical links 145, 148, and retrieves values corresponding to an actual state of the network entities 150, as disclosed at step 307. In the example SAN 110, the network entities 150 include storage arrays, hosts, network elements (switches and routers), logical connections, physical connections and ports, as depicted at step 308.

The policy compliance server 114 receives notifications 116 indicative of network events, at depicted at step 309, in which the network events indicate modification of a particular value such that the value defines a state of a particular network entity in the network environment. The compliance engine 134 evaluates the received notifications 116 against the rules 124 in the network policy 122 to identify network states inconsistent with a rule 124 indicative of the desired state for the evaluated network state, as shown at step 310. Evaluation of the breaches includes navigation of evaluated notifications 116 via a graphical user interface (GUI) responsive to an interactive user (operator), as shown at step 311, thus navigating the evaluated notifications 116 to identify states corresponding to a breach, as depicted at step 312. Evaluation considers current/startup states and ongoing activity, as the configuration can be in breach without any changes, i.e. the initial topology could be in breach without any change. Such evaluation encompasses change notification and .rediscovery, as well as initial topology. The user starts from breach/vulnerability evaluations and navigates to related network events/state that resulted in such evaluation. Navigation from the breach notification also provides you ability to navigate to related configuration changes and related events that rollup to the configuration changes.

The compliance engine 134 identifies a breach of a policy, in which the breach is indicative of a network state inconsistent with a rule 124 defined in the policy 122, as depicted at step 313. As indicated above, such a breach includes at least one instance of a vulnerability or a violation, in which the violation is indicative of an actual state deviating from a desired state specified by a rule 124, as disclosed at step 314, and the vulnerability is indicative of conditions that have potential to result in a violation, as shown at step 315.

In a large network, investigation of breaching entities may benefit from scrutiny of related and/or interconnected entities to pinpoint other irregularities or notable "red flag" states or occurrences. Therefore, it may be beneficial to reexamine network entities 150 related to those indicating or causing a breach. Accordingly, the notifications trigger rediscovery of related entities, as depicted at step 316, which further includes identifying related entities by determining entity groups, as shown at step 317. The related entities further define sets of related entities as groups, the related entities defined by an intersection of policy scope and rule scope, as shown at step 318. Each policy 122 includes a set of topically related rules 124 deemed appropriate for the governance of the policy, and the specific rules also define a scope of appropriate entities.

Identification of related entities includes determining a path 148 corresponding to the triggering entity 150, as depicted at step 319. Such a path includes physical and logical links, as shown at step 320, in which the logical links include at least one of mapping, masking and zoning of network entities, as is known to those in the art. The compliance engine 134 thus identifies related entities. Such related entities 150 may be in the same group, or otherwise have a common relation such as a path, link or connection, as disclosed at step 321.

As indicated above, the discovery process includes both periodic polling of network entities 150 as well as asynchronous notifications from the entities 150 concerning real time status updates of state changes (changes to discoverable configuration values, relationships, and dependencies). The rediscovery of related entities also include evaluating near-real time updates of notifications/alerts indicators, as depicted at step 322. Accordingly, the rediscovery includes notifications obtained by polling network entities to identify a change in state, as disclosed at step 323, and asynchronous notifications generated by network entities 150, as shown at step 324. The navigation of related entities may continue in an iterative manner by an operator by traversing among related entities 150 and their related notification, state, and/or status to isolate an underlying cause or condition of breach notifications. Accordingly, control reverts to step 310 for successive navigation of notifications 115.

Figure 7:
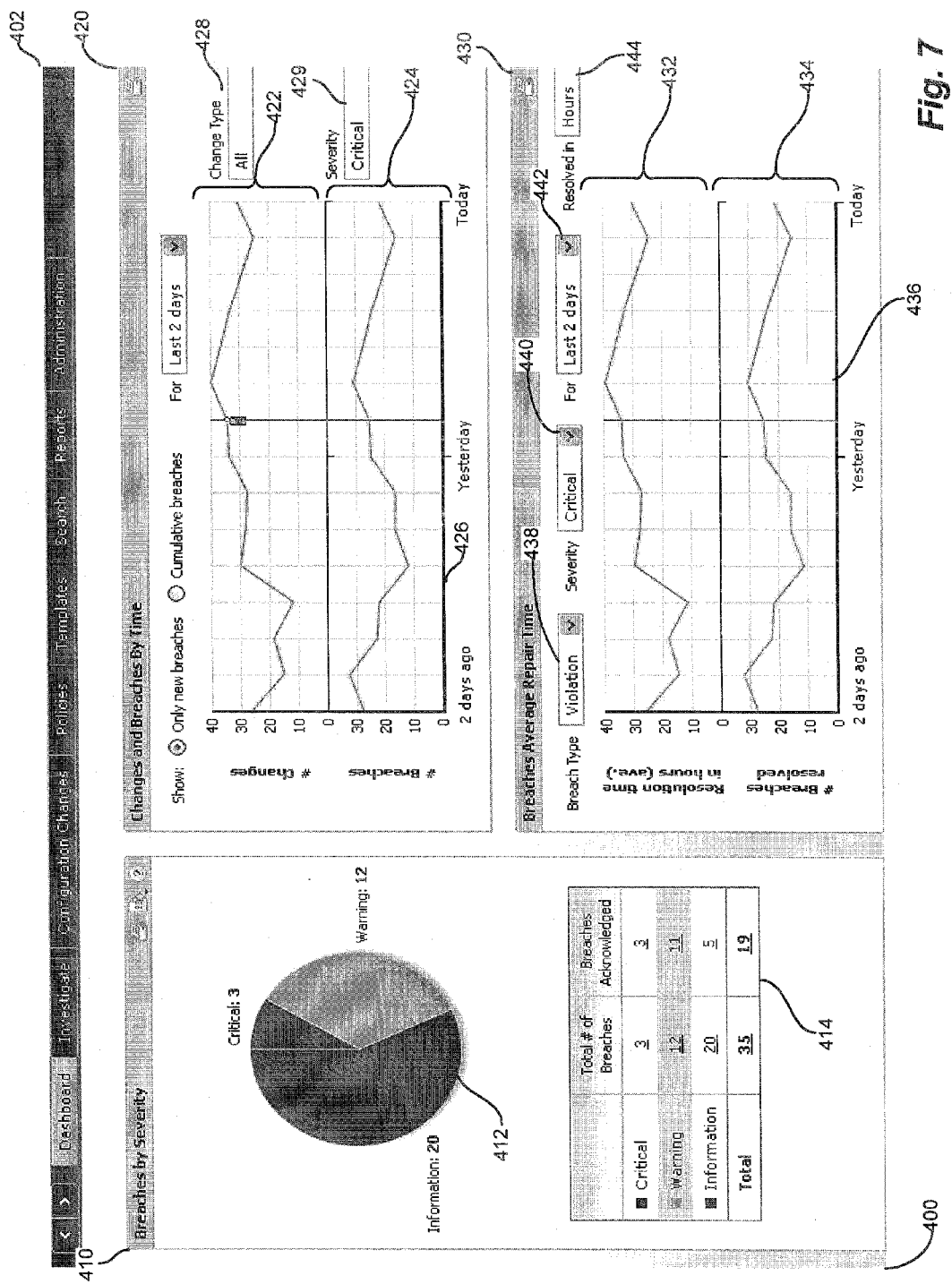
FIG. 7 is a breach dashboard view depicting a breach overview.

FIGS. 7-13 are breach investigation views rendered by the GUI in the sequence outlined in FIGS. 4-6. Referring to FIGS. 3 and 7, FIG. 7 is a breach dashboard view depicting a compliance overview. The dashboard view 400 includes a navigation bar 402 for accessing successive views. The dashboard view also includes a severity chart 410, a breach/time correlation view 420, and a breach/repair correlation view 430. The severity chart 410 displays a graph 412 of breaches according to severity. In the example arrangement, the informational portion may be considered vulnerabilities, corresponding to notifications of an informational nature. The warning and critical portions may be considered violations. Alternate configurations may categorize the violation level of notifications accordingly. An acknowledgement chart 414 indicates the number of breaches that have been acknowledged by an operator.

The breach/time correlation view 420 presents a graph of configuration changes 422 and breaches 424 along the same time axis 426. A filtering pulldown allows filtering on the type of configuration change 428 and on the breach severity 429. The common time axis 426 pinpoints the correlation of network configuration changes to breaches, since it is estimated that as much as 80% of breaches are attributable to network configuration changes.

A breach/repair correlation 430 performs a similar comparison for resolution (repair) time for breaches against the number of breaches. The resolution graph 432 identifies the typical (average) repair time for a breach over a particular time window, and the resolution graph 434 plots the number of breach resolutions completed in the same time axis 436. This view 430 allows a tracking of whether a significant number of breaches is affecting the resolution time, indicating a need for additional network resources (people) for resolving breaches. Filtering pulldowns 438-444 allow selection of included breaches. Pulldown 438 allows selection of violations, vulnerabilities, or breaches (both). Pulldown 440 filters on the severity, which may also imply the type. Pulldown 442 allows specification of the range of the time axis 436, and pulldown 444 modifies the granularity of the time increments, such as hourly, daily, 4 hours, etc.

Figure 8:
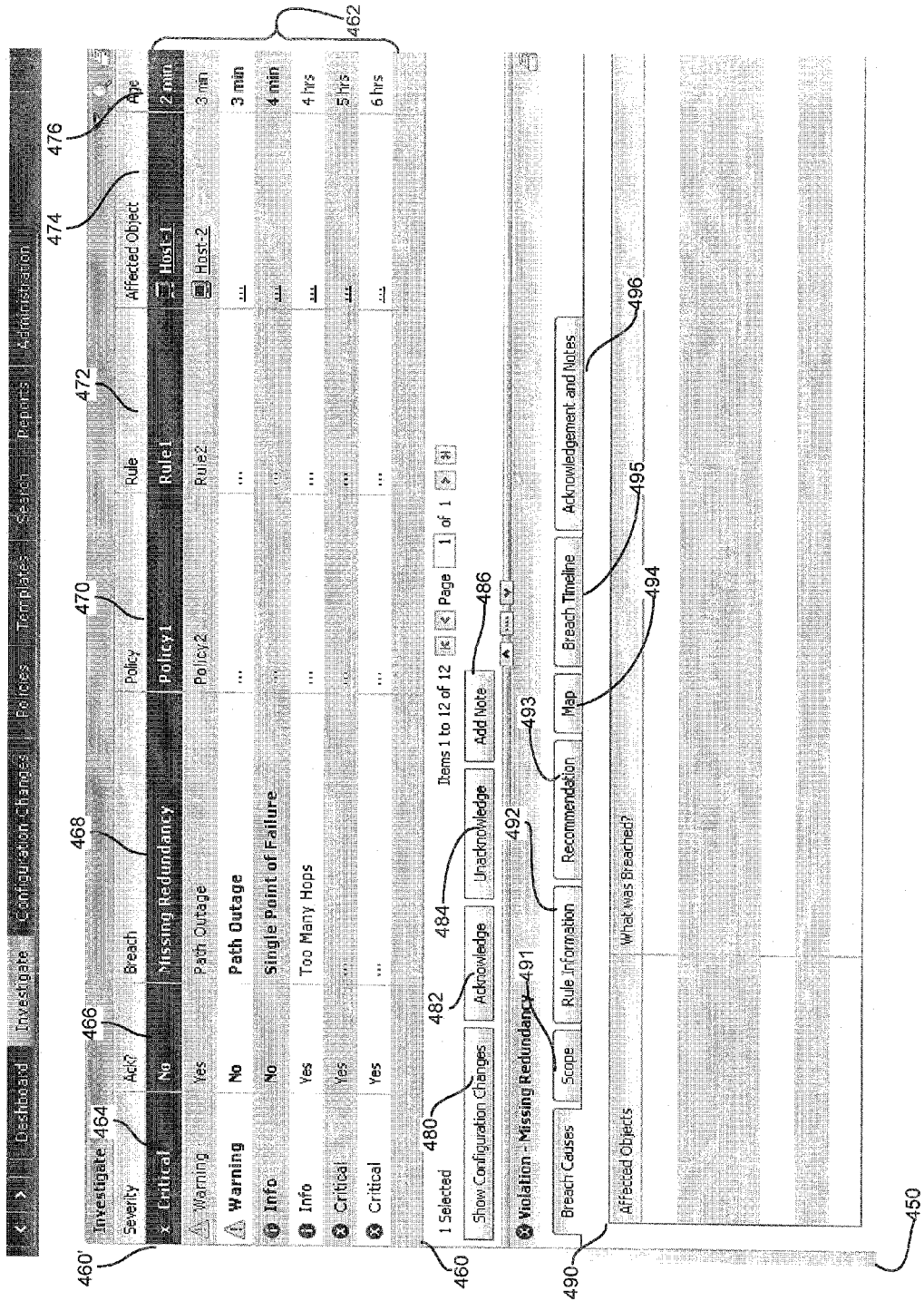
FIG. 8 is a breach investigation view showing a set of breach notifications.

FIG. 8 is a breach investigation view showing a set of breach notifications. Referring to FIG. 8, the investigate view 450 includes a breach (violations and/or vulnerabilities) list 460 and a detail window 490. The breaches notifications list 460 includes a current selection set 462 of notifications 116 indicating a breach for further investigation via drill down GUI activity. A severity attribute 464 indicates the severity of the breach indicated by the notification 116. Note that not all notifications 116 received relate to breaches; the discoverer 130 distinguishes between network event notifications and breaches. An acknowledgment attribute 466 indicates whether an operator has acknowledged this breach, settable by buttons 482 and 484. A breach attribute 468 indicates the condition name/verbal description of what was breached, and the policy and rule attributes 470, 472 indicate the rule and policy that was breached. An affected object attribute lists the network object 150 issuing the notification 116 triggering the breach.

The detail window 490 contains further details about a selected notification 460' depending on a set of violation tabs 490-496. A breach causes tab 490 shows related objects and entities based on the path and group of the affected objects 474. A scope tab 491 shows the scope of the rule from which the breach was triggered, and a rule information tab 492 shows additional rule specifications such as the condition and expected value the rule requires. A recommendation tab 493 shows typical or known remedial action to undertake for a particular rule breach. A map tab 494 shows a graphical rendering of the affected object 474 and it's related network entities in the network fabric 140. A breach timeline 495 lists the first and most recent occurrences of a breach in a series of recurring breaches affecting the same entity 150, thus removing the need to explore uncorrelated redundant occurrences of a recurring breach. An acknowledgment and notes tab 496 displays the acknowledgment status as set per buttons 482 and 484, and any notes entered by an operator via notes button 486. The show configuration changes 480 lists related configuration changes, which typically have a high correlation to breaches occurring shortly thereafter.

Figure 9:
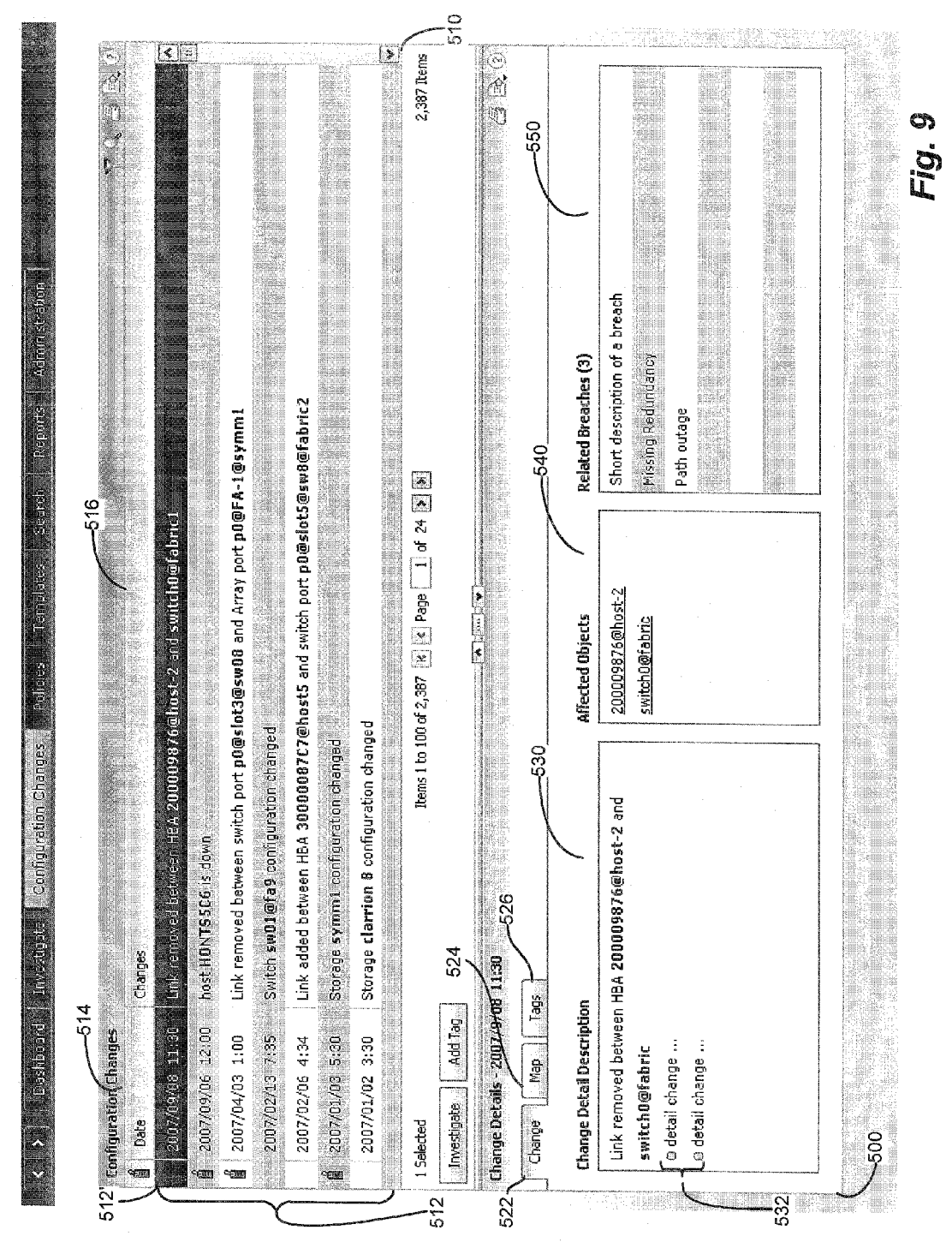

FIG. 9 is a configuration change screen itemizing configuration changes. Referring to FIGS. 3 and 9, the configuration changes view 500 displays notifications pertaining to configuration changes in the network 110. As stated above, configuration changes tend to have a high correlation to breaches, and are therefore an efficient locator of suspect occurrences and breach causes. The configuration changes view 500 includes a change notification window 510 including a set of change entries 512, and a tab window 520 for displaying detail tabs for change 522, maps 524 and tags 526. The tabs 522, 524 and 526 display additional information about a selected change entry 512' from the change notification window 510. Each change entry 512 includes a datestamp 514 and a description 516 about the change. For the selected entry 512' the change tab 522 shows change details 532 about the configuration change in a change details window segment 530, such as previous and new values/settings, usage metrics, and previous and recent configuration changes, for example. The affected objects window segment 540 lists affected objects (objects that are impacted by the configuration changes), such as those in the same group or along the same path, discussed further below, as well as services and dependencies. These affected objects suggest those for which notification may be evaluated for identifying likely causes or related effects. A related breaches window 550 shows correlated breaches affecting the related objects displayed in the affected objects window 540.

Figure 10:
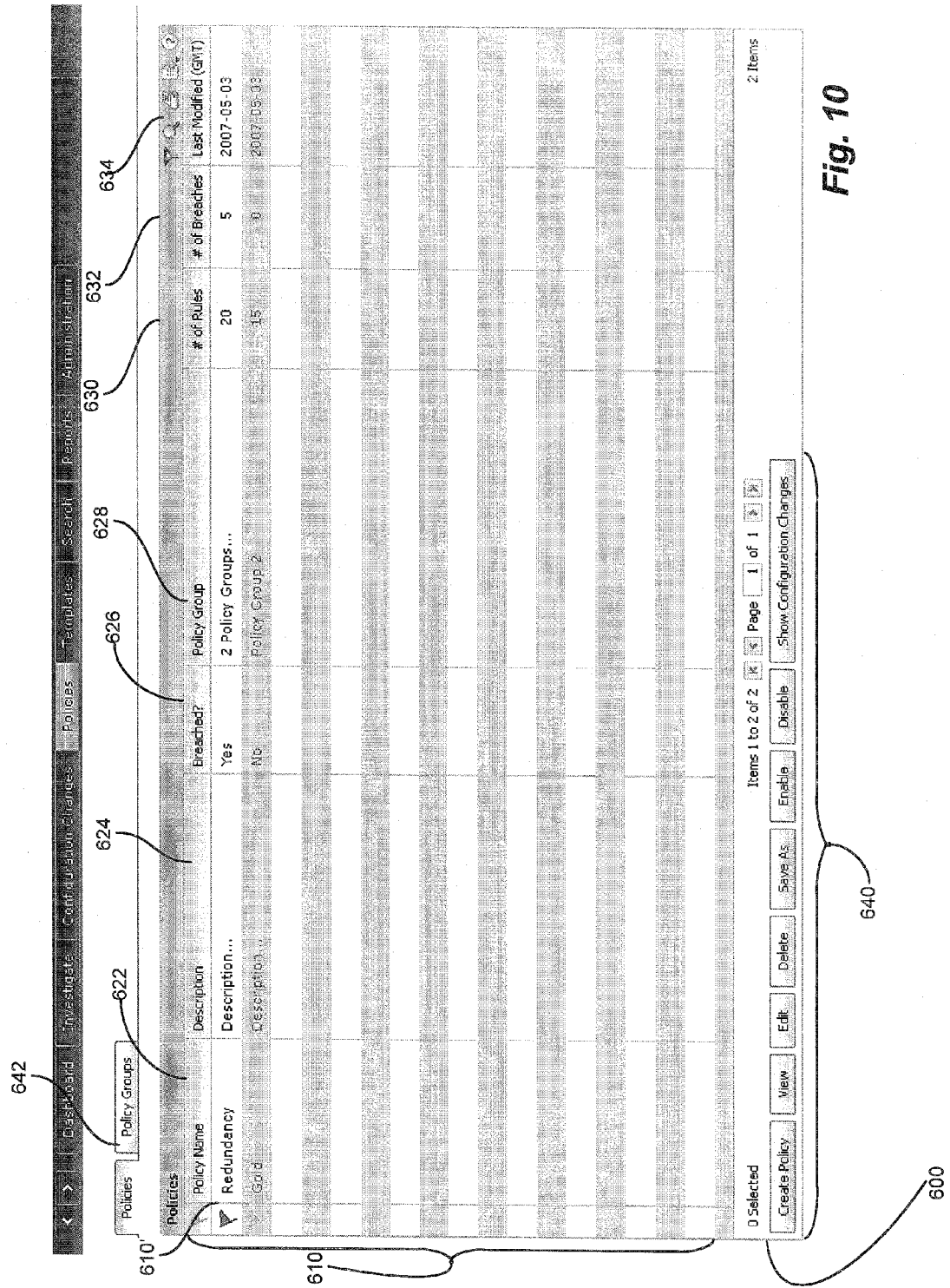
FIG. 10 is a policy summary illustrating compliance.

FIG. 10 is an information network policy summary list illustrating list of compliance policies (i.e. rules therein). Referring to FIGS. 3 and 10, a policies summary window 600 includes a set of policy entries 610 reflecting policies in force. For each policy 610', the entry 610 displays fields 620, including the policy name 622, policy description 624, whether the policy has been breached 626, the groups for which the policy is in force 628, the number of rules in the policy 630, the number of breaches 632, and the last modification date 634 for the policy. The determination of whether the policy has been breached is a function of the number and severity (vulnerability or violations) of the breaches. Also included are modification buttons 640 for modifying the policies. A policy groups tab 642 shows different policies which may be in effect for different network groups, such as for other geographic locations or other business areas. In other words, a policy group represents a grouping of policies. This provides a mechanism for a user to logically group the policies according to a given application/service, location, policy tier for application/service, etc.

Figure 11:
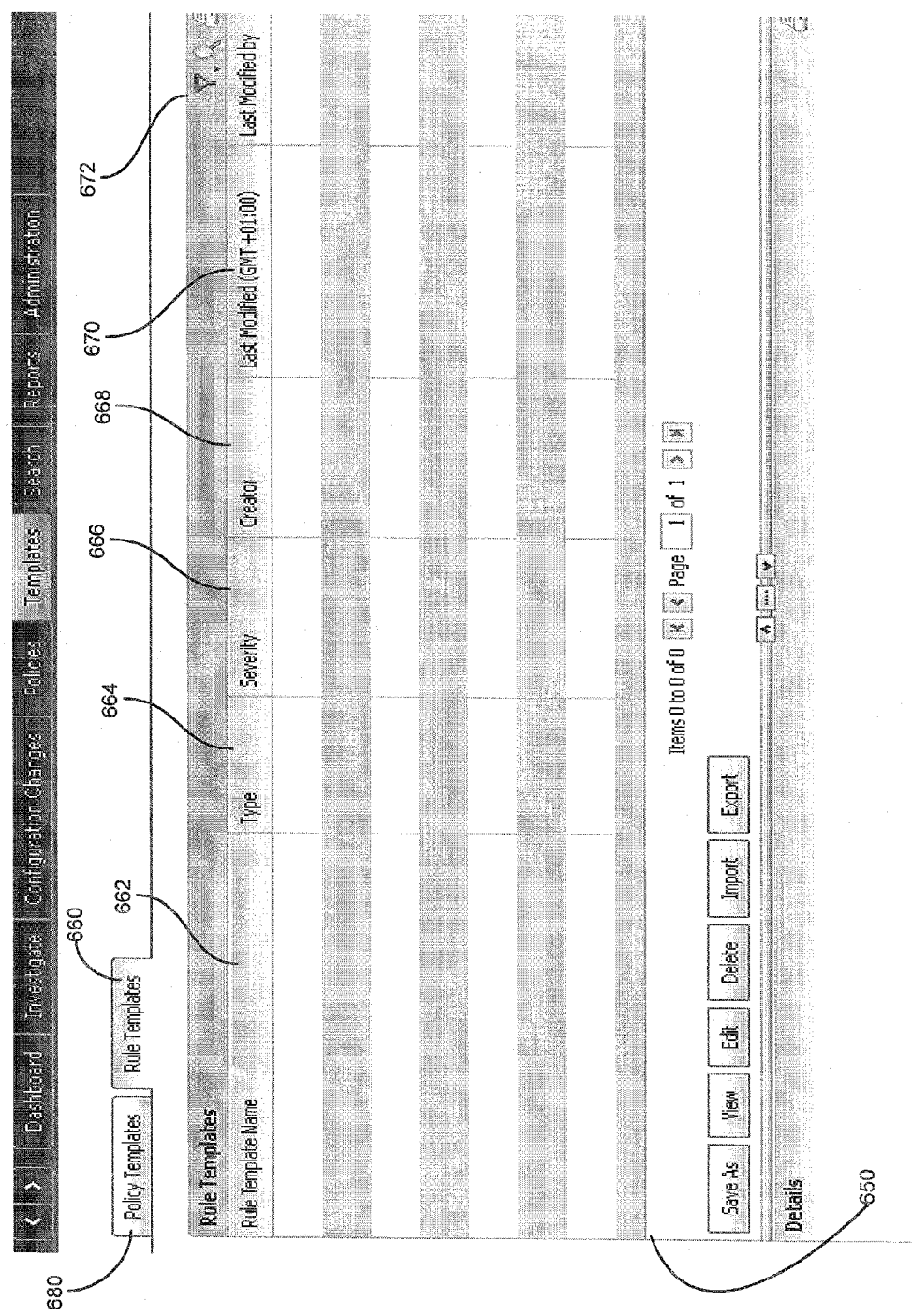
FIG. 11 is a rule template that summarizes rules used in the policies.

FIG. 11 is a rule template summary of rules in the policies. Referring to FIGS. 3 and 11, a template window 650 shows available policy and rule templates. The policy and rule templates are default or initial sets available for modification and customization in particular instances. The displayed rule template tab 660 includes a template name 662, a type 664, a severity 666, a creator 668, a last modified 670, and a last modified user 672. The creator 668 and last modified 672 fields list the operator responsible for the indicated changes, allowing an audit trail of activity. Once the rules are incorporated into a policy, they become part of that policy—the templates provide a convenience for establishing reasonable parameters. The policy template tab 680 provides similar functionality for policies. The rule and policy templates are discussed in further detail in the copending applications cited above.

Figure 12:
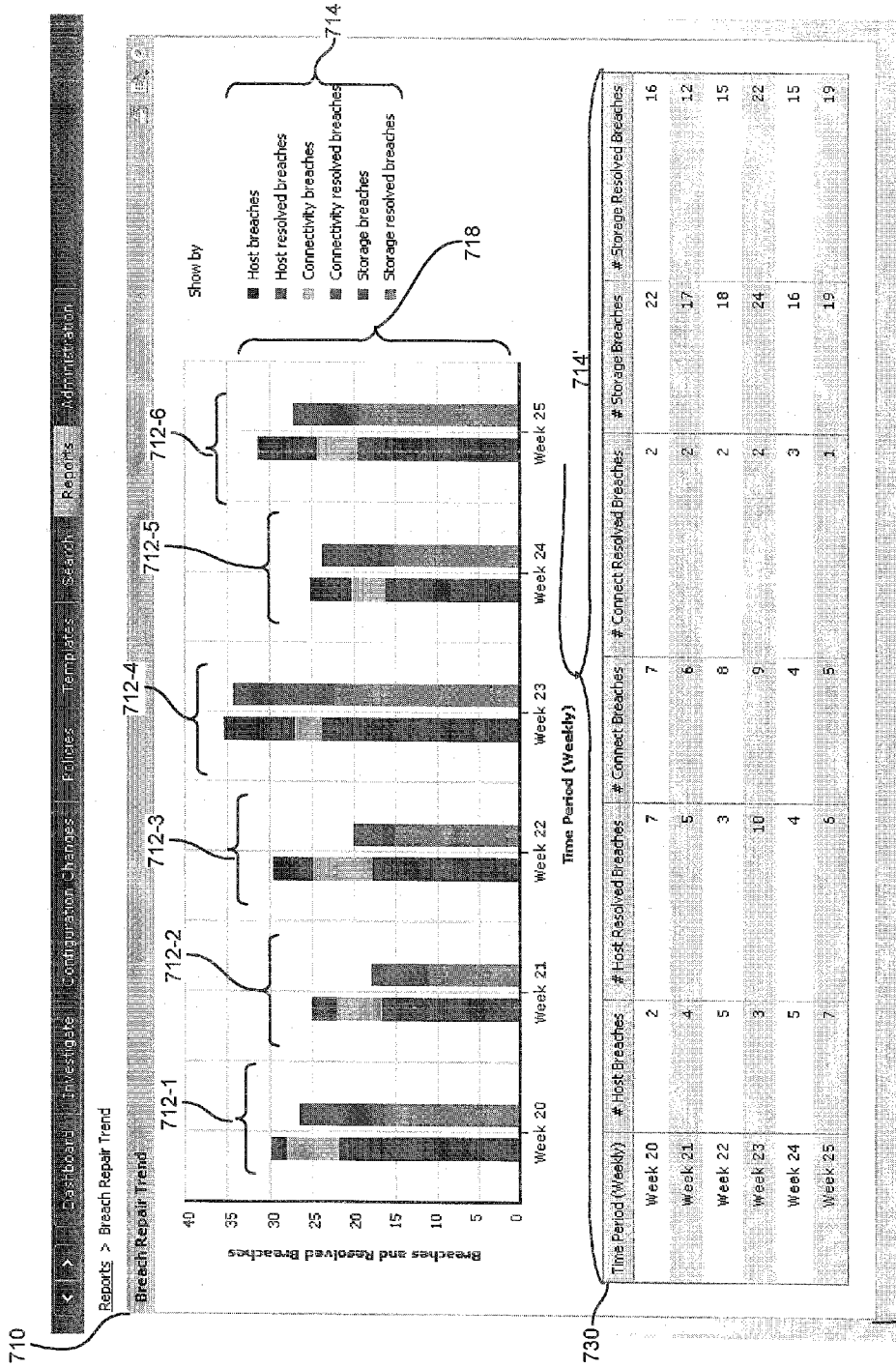
FIG. 12 is a report of breach repair trends.

FIG. 12 is a report of breach repair trends allowing correlation to the frequency and repair of breaches. Referring to FIGS. 3 and 12, a report display 700 includes a repair trend window 710 and a tabular report window 730. The repair trend window 710 lists a set of histograms 712-1...712-N for each of a set of breach types 714 occurring during each respective interval of a time axis 716, shown weekly. For each week or other interval 716, a color coded histogram entry 718 shows the respective breach types. The tabular report window 730 shows each of the breach types 714' in tabular (numerical) form. The report allows analysis of the resolution rate vs. the occurrences of new breaches, thus indicating if breach repair resources are sufficient or suggesting a bottleneck of issues. Alternate configurations depict other types of reports. It is notable that the reports identify various causes and resolution of breaches, including both violations and vulnerabilities.

Figure 13:
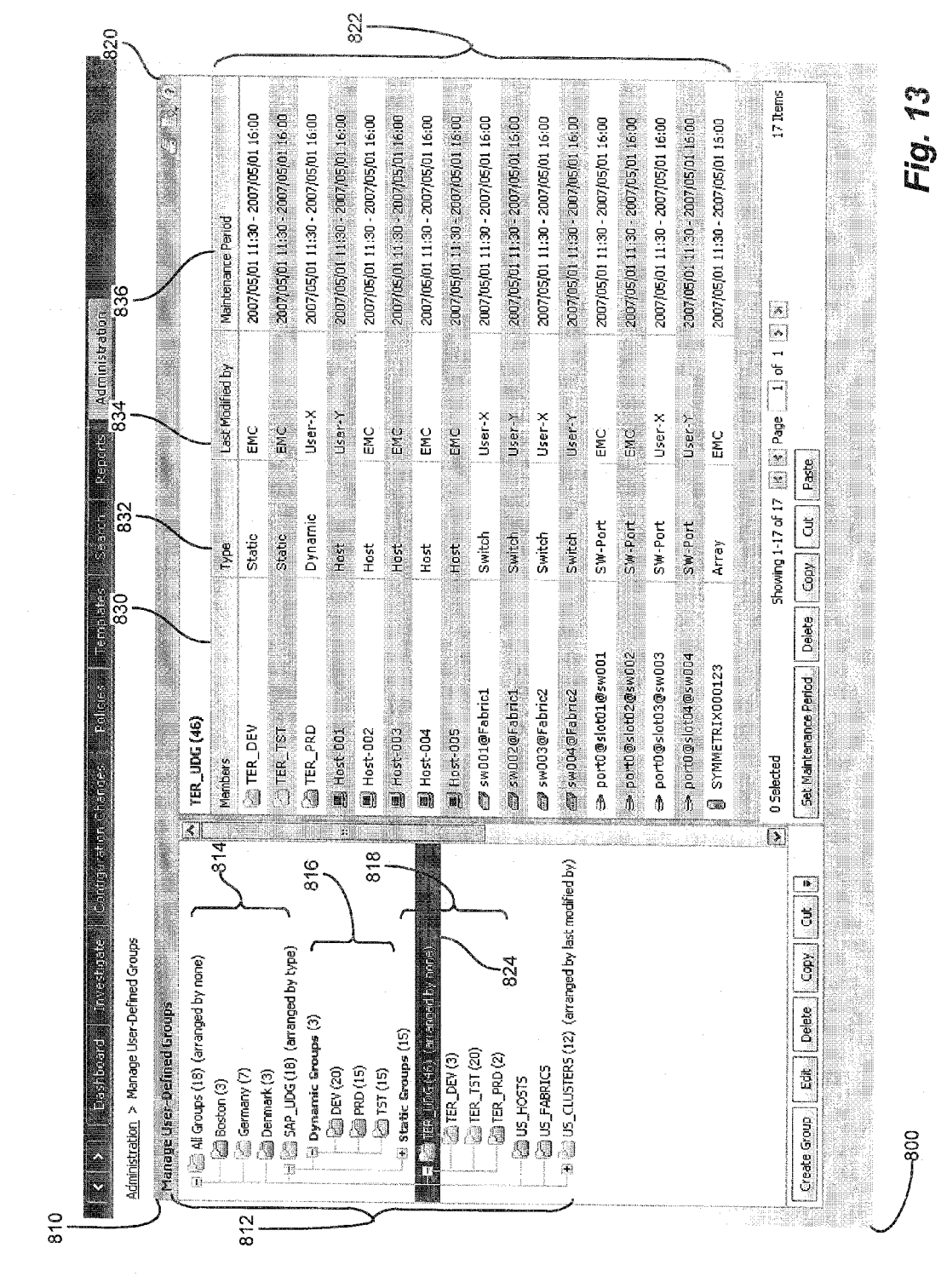

FIG. 13 shows administrative views including groups of network entities. The groups of network entities are in turn used for the policy scope and possibly the rule scope. Various administrative options may be pursued from the administration tab on the tab row 402. Referring to FIGS. 4 and 13, an example administrative display 800 includes a group hierarchy window 810 and a group member window 820. The group hierarchy window 810 displays available groups, arrangeable by various topical criteria, such as geographically related groups 812, dynamic groups 814 related by dynamic criteria such as nodes that are currently enabled or online, and static groups 816 such as those connected to a particular host, for example.

The group members window 820 includes a set of entries 822 included in a currently selected group 824 from the group hierarchy window 810. Each of the entries 822 includes the name 832 of the network entity 150, the type 152 of the network entity 150, the operator 834 who last modified configuration values, and the time 836 of the most recent maintenance period, during which notifications may have been polled.

Figure 14:
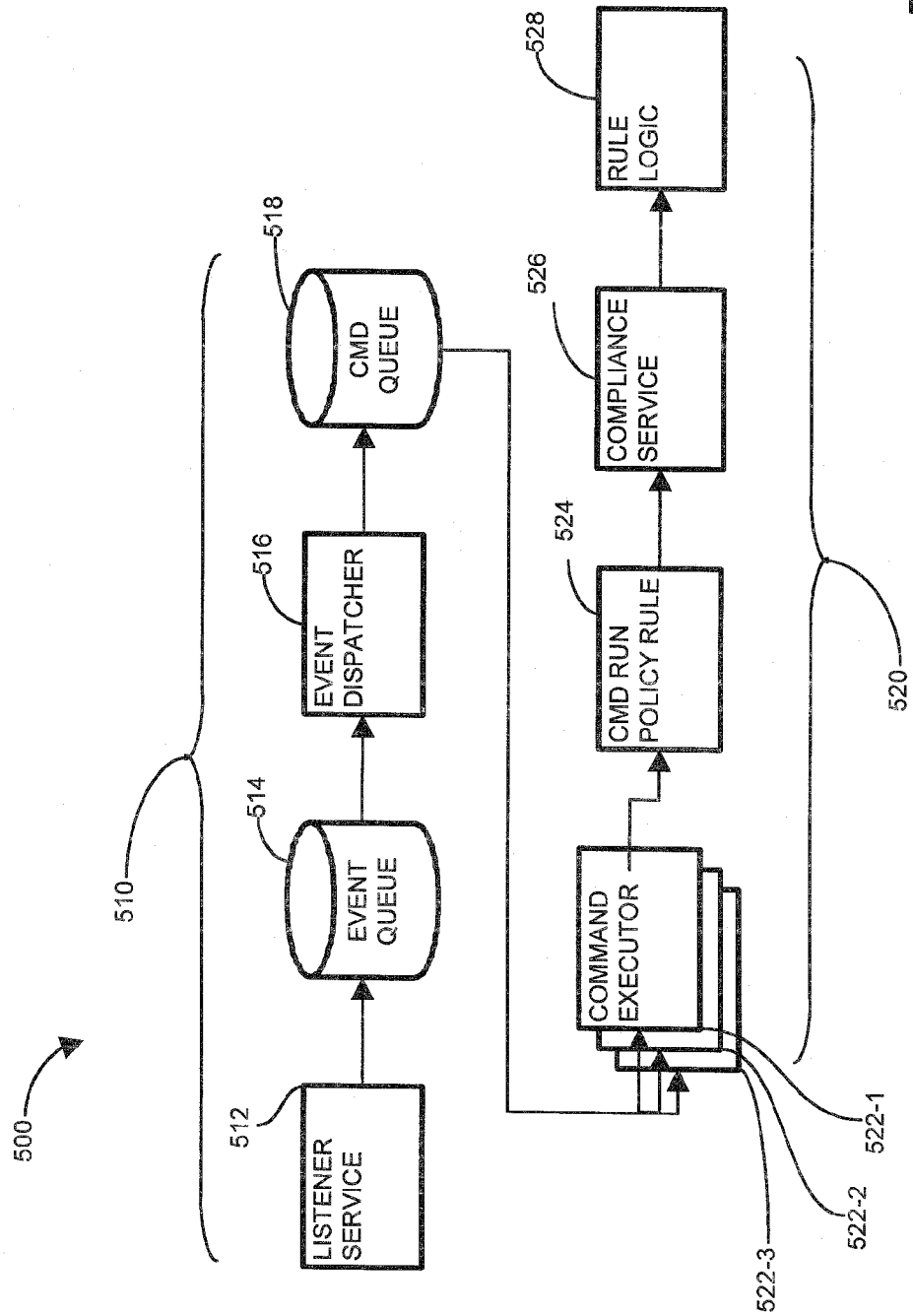
FIG. 14 shows the architecture of the compliance engine in FIG. 3.

In further detail, FIG. 14 shows the architecture of the compliance engine 134 in FIG. 3. Referring to FIGS. 3 and 14, the compliance engine 134 evaluates rules 124 as a response to (near) real-time network event notifications 116, and how the notifications 116 are correlated to breaches. The compliance engine architecture 500 includes notification sequence 510 for gathering notifications and a command sequence 520 for applying the rules to the notification 116. A listener service 512 identifies and intercepts occurrences in the environment 100 such as alerts and events, and stores them on the event queue 514. An event dispatcher 516 operates on the event queue 514 and identifies notifications 116 pertaining to policies 122s. A set of command executors 522-1...522-3 (522 generally) operate concurrently to drain the command queue 518 and determine, for each notification, a policy and rule scope applicable according to the cmd run policy rule module. For each notification 116 triggering a particular policy 122 and rule 124, a compliance service 526 applies rule logic 528 to compute applicability of the rule 124, i.e. whether the notification 116 indicates a breach against the desired condition stated in the rule 124.

It should be noted that the compliance engine 134 is event driven. It reacts to topology change events, and tries to identify breaches as the topology state change is detected by the discovery mechanisms, thus operating in a real-time or near real time. In other words, it need not accumulate a set of notifications 116 for batch processing on an hourly or nightly basis, for example. It also does not require the user to initiate the rules/policies validation.

The compliance engine 134 maintains an internal work plan (identified as the Cmd Queue 518) that keeps getting updated based on the events coming in from the discovery sources. This is done for several reasons:

Improved performance: the compliance engine 134 only validates policies 122 against a solid topology state. If a switch port is "flickering" (changing status from offline to online and back continuously), for example, the compliance engine 134 will validate the policy 122 related to that switch only once.

User convenience: The compliance engine 134 will only report once on the breach rather than showing a "flickering" breach, or generating multiple breaches.

Not to block or overwhelm the compliance engine 134: due to multitude of events that may prevent the compliance engine 134 from validating other policies 122 based on events (notifications 116) from the discovery sources.

A policy group DB entity arranges the policies by groups indicative of related policies 122. As indicated above, policies 122 in a group may trigger rediscovery should a notification 116 trigger a rule in one of the policies in the group.

Those skilled in the art should readily appreciate that the programs and methods for investigating policy breaches as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for investigating policy breaches has been particularly shown and described with references to embodiments thereof, it will be understood by those skilled in the art that various changes in form and details may be made therein without departing from the scope of the invention encompassed by the appended claims.

What is claimed is:

1. A method of tracking network compliance at a policy compliance server in a network environment, the method comprising:

discovering network entities in the network environment at the policy compliance server, wherein the network environment comprises a storage area network (SAN) and wherein the network entities comprise storage domain entities selected from a group consisting of storage arrays, hosts, switches, physical links, logical links, and interconnections therebetween, the discovery identifying configuration data applicable to rules of a network policy, the rules for specifying a desired state of a network entity, the state including relations and dependencies on other network entities in the network environment;

receiving notifications at the policy compliance server indicative of network events, the network events modifying a value defining a state of a network entity in the network environment; and evaluating the received notifications against the rules in the policy to identify a breach of a policy, wherein the breach of the policy comprises a vulnerability indicative of a network environment state not yet deviating from a desired network environment state specified by a rule but having potential to result in a violation, wherein the violation is indicative of a network environment state deviating from a desired network environment state specified by a rule.

2. The method of claim 1 wherein the network environment defines a network fabric interconnecting network entities, such that discovering network entities in the network environment further comprises:
   traversing the network fabric;
   identifying physical links in the network fabric;
   identifying logical links in the network fabric;
   identifying entities interconnected by the physical and logical links; and
   retrieving values corresponding to an actual state of the network entities.

3. The method of claim 2 wherein the network entities further comprise configuration settings, ports, services, and dependencies.

4. The method of claim 3 wherein discovering network entities in the network environment retrieves configuration data including events, notifications, indicators, infrastructure software, host and network access control configuration, storage and their respective configurations, host configurations, network elements and their respective configurations and physical and logical connections, the configuration data being state information including attributes having values, the attributes indicative of adherence to a desired state, adherence based on the values corresponding to an expected value for a desired state such that the rules are responsive to the configuration data for identifying conformity with a particular rule.

5. The method of claim 1 wherein the notifications trigger rediscovery of related entities, further comprising identifying related entities by:
   determining entity groups;
   determining a path corresponding to the triggering entity; and
   identifying related entities in same path or group.

6. The method of claim 5 wherein the path includes physical and logical links, the logical links including at least one of mapping, masking, and zoning.

7. The method of claim 5 further comprising evaluating redundant paths by:
   iterating over determined paths, each path defining at least one association between network entities;
   for each defined association, counting distinct instances of the network entities defining the paths;
   identifying a rule indicative of a minimum redundancy of paths between the network entities; and
   generate breach indications for each network entity with insufficient redundancy.

8. The method of claim 7 wherein the network entities denoting the paths include storage arrays and hosts, each storage array having a path from at least one host.

9. The method of claim 5 wherein the entities further define sets of related entities as groups, the related entities defined by an intersection of policy scope and rule scope.

10. The method of claim 5 wherein rediscovery further comprises evaluating near-real time updates of notifications/alerts by at least one of:
   polling network entities to identify a change in state; and
   asynchronous notifications generated by network entities.

11. The method of claim 1 wherein the that the network entities further comprise routers, ports, network adapters, and links, and wherein the breach is indicative of an actual state deviating from an intended state of a storage domain entity.

12. The method of claim 1 further comprising generating a notification upon modification of one of the rules in a policy, the notification indicative of addition, removal, enabling or disabling of the rule.

13. The method of claim 1 further comprising merging identified breaches with existing breaches from previous discovery, merging eliminating duplicate notifications indicative of the same violation.

14. The method of claim 1 further comprising:
   testing, in an iterative manner, each object discovered during the discovery against each rule in the network policy; and
   enumerating, as a stream of notifications, an indication of each breach revealed by the testing.

15. The method of claim 1 wherein evaluating the received notifications against the rules in the policy comprises:
   identifying network states inconsistent with a rule indicative of the desired state for the evaluated network state; and
   navigating evaluated notifications via a graphical user interface (GUI) responsive to an interactive user.

16. A network policy server in a network environment comprising:
   a processor; and
   memory storing computer-executable code that when executed on the processor causes the network policy server to:
   discover network entities in the network environment, wherein the network environment comprises a storage area network (SAN) and wherein the network entities comprise storage domain entities selected from a group consisting of storage arrays, hosts, switches, physical links, logical links, and interconnections therebetween, the discovery identifying configuration data applicable to rules of a network policy, the rules for specifying a desired state of a network entity, the state including relations and dependencies on other network entities in the network environment, the discoverer further operable to receive notifications indicative of network events, the network events modifying a value defining a state of a network entity in the network environment; and
   evaluate the received notifications against the rules in the policy to identify a breach of a policy, wherein the breach of the policy comprises a vulnerability indicative of a network environment state not yet deviating from a desired network environment state specified by a rule but having potential to result in a violation, wherein the violation is indicative of a network environment state deviating from a desired network environment state specified by a rule.

17. The server of claim 16 wherein the computer-executable code further causes the network policy server to:
   identify network states inconsistent with a rule indicative of the desired state for the evaluated network state; and
   navigate evaluated notifications via a graphical user interface (GUI) responsive to an interactive user.

18. The server of claim 16 wherein the network environment defines a network fabric interconnecting network entities, and wherein the computer-executable code further causes the network policy server to:
- traverse the network fabric;
- identify physical links in the network fabric;
- identify logical links in the network fabric;
- identify entities interconnected by the physical and logical links; and
- retrieve values corresponding to an actual state of the network entities.

19. The server of claim 16 wherein the notifications trigger rediscovery of related entities, and wherein the computer-executable code further causes the network policy server to identify comprising related entities by:
- determining entity groups by defining sets of related entities as groups via an intersection of policy scope and rule scope;
- determining a path corresponding to the triggering entity; and
- identifying related entities in same path or group.

20. The server of claim 19 wherein the path includes physical and logical links, the logical links including at least one of mapping, masking, and zoning.

21. The server of claim 19 wherein rediscovery further comprises evaluating near-real time updates of notifications/alerts by at least one of:
- polling network entities to identify a change in state; and
- asynchronous notifications generated by network entities.

22. The server of claim 16
- wherein the network entities further comprise applications, services, routers, ports, network adapters, and links;
- wherein the violation breach is indicative of an actual state deviating from an intended state of a storage domain entity;
- wherein the computer-executable code further causes the network policy server to retrieve configuration data including events, notifications, indicators, infrastructure software, host configuration, storage configuration, switch and router configuration, host and network access control configuration, network management and host connections; and
- wherein the configuration data is state information including attributes having values, the attributes indicative of adherence to a desired state, adherence based on the values corresponding to an expected value for a desired state such that the rules are responsive to the configuration data for identifying conformity with a particular rule.

23. A computer program product having a non-transitory computer readable storage medium operable to store computer program logic embodied in computer program code encoded as a set of processor based instructions thereon for tracking network policy compliance in a network environment comprising:
- computer program code for discovering network entities in the network environment, wherein the network environment comprises a storage area network (SAN) and wherein the network entities comprise storage domain entities selected from a group consisting of storage arrays, hosts, switches, physical links, logical links, and interconnections therebetween, the discovery identifying configuration data applicable to rules of a network policy, the rules for specifying a desired state of a network entity, the state including relations and dependencies on other network entities in the network environment;
- computer program code for receiving notifications indicative of network events, the network events modifying a value defining a state of a network entity in the network environment; and
- computer program code for evaluating the received notifications against the rules in the policy to identify a breach of a policy, wherein the breach of the policy comprises a vulnerability indicative of a network environment state not yet deviating from a desired network environment state specified by a rule but having potential to result in a violation, wherein the violation is indicative of a network environment state deviating from a desired network environment state specified by a rule.

* * * * *